United States Patent [19]

Christian et al.

[11] Patent Number: 5,760,378
[45] Date of Patent: Jun. 2, 1998

[54] METHOD OF INDUCTIVE BONDING SINTERED COMPACTS OF HEAVY ALLOYS

[75] Inventors: Wendell L. Christian; Mark R. Mabry, both of Kingsport, Tenn.

[73] Assignee: Aerojet-General Corporation, Sacramento, Calif.

[21] Appl. No.: 843,903

[22] Filed: Apr. 17, 1997

[51] Int. Cl.⁶ .................... H05B 6/10; B23K 13/01
[52] U.S. Cl. .............. 219/603; 219/651; 75/10.14; 419/49; 419/52
[58] Field of Search ................ 219/603, 602, 219/615, 635, 651, 659; 228/101, 110.1, 262.7, 173.1, 173.2; 75/10.14, 10.18; 419/48–55

[56] References Cited

U.S. PATENT DOCUMENTS

| | | | |
|---|---|---|---|
| 3,897,223 | 7/1975 | Purdy et al. ................ 29/195 |
| 3,963,163 | 6/1976 | Oshida ...................... 228/196 |
| 4,116,688 | 9/1978 | Kaarlela ..................... 75/229 |
| 4,170,473 | 10/1979 | Gerken ...................... 75/208 |
| 4,236,923 | 12/1980 | Takahashi et al. ......... 75/208 |
| 4,325,734 | 4/1982 | Burrage et al. ............ 419/48 |
| 4,710,235 | 12/1987 | Scruggs ..................... 148/4 |
| 4,743,512 | 5/1988 | Marlowe et al. ........... 428/552 |
| 4,817,858 | 4/1989 | Verpoort ................... 228/193 |
| 4,851,188 | 7/1989 | Schaefer et al. ........... 419/19 |
| 5,013,611 | 5/1991 | Suzuki et al. .............. 428/552 |
| 5,124,118 | 6/1992 | Youssef et al. ............ 419/9 |
| 5,134,260 | 7/1992 | Piehler et al. ............. 219/651 |
| 5,156,321 | 10/1992 | Liburdi et al. ............. 228/119 |
| 5,330,702 | 7/1994 | Kippenberg et al. ...... 419/28 |
| 5,346,667 | 9/1994 | Kamitsuma et al. ....... 419/52 |
| 5,452,843 | 9/1995 | Dennis ....................... 219/615 |
| 5,460,776 | 10/1995 | Ackermann et al. ....... 419/44 |
| 5,484,096 | 1/1996 | Tank .......................... 228/121 |
| 5,540,884 | 7/1996 | Chiao ........................ 419/47 |
| 5,690,891 | 11/1997 | Choudhury et al. ....... 75/10.14 |

*Primary Examiner*—Philip H. Leung
*Attorney, Agent, or Firm*—Brinks Hofer Gilson & Lione

[57] ABSTRACT

A method of bonding two or more sintered compacts of tungsten heavy alloys. The method includes the steps of providing two or more sintered compacts of tungsten heavy alloy powder and then positioning the sintered compacts in adjacent alignment in a furnace chamber. A localized induction field is applied only at the juncture of the sintered compacts to bond the sintered compacts and produce a monolithic assembly of sintered compacts having a bond strength substantially equal to the strength of the sintered compacts.

20 Claims, 1 Drawing Sheet

METHOD OF INDUCTIVE BONDING SINTERED COMPACTS OF HEAVY ALLOYS

FIELD OF THE INVENTION

The present invention relates to a method of bonding two or more sintered compacts of tungsten heavy alloys. More particularly, the present invention relates to a method of bonding two or more sintered tungsten heavy alloy compacts by localized sintering through the use of induction heating to produce a monolithic assembly of sintered compacts having a net-shape or near net-shape approximately equal to the combined sintered compacts.

BACKGROUND OF THE INVENTION

A part that is formed of tungsten heavy alloy powders has conventionally been produced as one-piece. Tungsten heavy alloy powders, along with matrix metal powders, are conventionally pressed at high pressures to form a compact and then sintered to achieve a product that is near its theoretical density. A compact is an unsintered object, i.e., green, produced by the compression of metal powders, generally while confined in a die or mold. Moreover, a sinter operation refers to the heating of a compact so that it shrinks and densifies to a density approaching its void free or fully dense condition. A sintering operation includes liquid phase sintering and solid state sintering. During liquid phase sintering, the compact is sintered by heating under conditions such that the compact shrinks and densifies to a density approaching void free or fully dense condition wherein some liquid forms around the periphery of the particles during the sintering operation. In contrast, during solid state sintering, the compact is sintered by heating under conditions such that the compact shrinks and densifies to a density approaching void free or fully dense condition wherein no component melts during the sintering operation.

The maximum size of a one-piece compact that may be produced using conventional powder metallurgy techniques is limited by several factors. Two of the most important factors are associated with the problems presented in the material handling of a green compact or presintered compact and the problems presented by distortion or slumping of the material during sintering.

The difficulty in handling compacts stems primarily from the low strength of an unsintered or presintered compact and the high density or weight of the tungsten heavy alloy powders. The unsintered or presintered compact is easily broken if it is not sufficiently supported prior to sintering. The structural integrity of the compact follows general rules of other structural members, in as much as some shapes are more resistant to forces than others. High length to diameter ratio compacts are difficult to handle, and similarly, compacts with high weight, relatively long dimensions in one or two axes, and small cross sectional areas are difficult to handle. The length to diameter ratio of the compact becomes more critical as the weight of the compact increases.

The second limiting factor for producing a large tungsten heavy alloy compact through liquid phase sintering is slump. Slump refers to the distortion or drooping of material as it is processed through the sintering furnace. Slump increases as the compact volume increases or the compact shape becomes more complex. Structural support of the compact during this phase is often not possible because tungsten heavy alloy powders processed through liquid phase sintering can have linear dimensional changes of up to 30%. To sinter to net-shape or near net-shape compacts depends on the amount of liquid phase formed and the structural rigidity of the solid skeleton formed by the tungsten particles. Compacts with areas of minimal support such as cantilevered areas, rounds, tubes, etc., have a large amount of slumping which cannot be accurately predicted. Accordingly, the linear dimensional changes in a compact from liquid phase sintering are attempted to be taken into account by adjusting the size of the compact by careful design of the compact. For example, linear dimensional changes are typically accounted for by producing oversize compacts and then cutting the desired final shape at the cost of the excess material used to form the compact. With some tungsten alloys, slump can degrade the final properties of the compact through non-homogeneous dispersion of tungsten and matrix metal. Slump typically worsens as the ratio of matrix metal to tungsten increases. For example, 90% tungsten and 10% matrix metal is more susceptible to slump than 95% tungsten and 5% matrix metal. The additional tungsten acts as a more stable skeleton to support the compact when the matrix metal is in the liquid phase during sintering.

One solution to the problems associated with slumping and handling of a compact to form a large one-piece compact is to join together multiple sintered compacts. However, heretofore when multiple parts of sintered compacts are to be joined or assembled, common fastening practices such as brazing, bolting riveting are employed. In may cases these techniques are sufficient. However, for assemblies that require substantially the same base metal strength and thermal characteristics, traditional joining methods are inadequate.

The present invention addresses the foregoing problems. It will be appreciated that by making the components of smaller sintered compacts the handling weight of the individual compacts is reduced, the amount of slump due to structurally supporting or not supporting the compact is reduced, and depending on the alloy, a more homogeneous product is formed.

By producing smaller pressings, sintering them separately, and joining them in a secondary localized sintering operation, larger compacts can be produced with less distortion. Localized sintering at the joint interface bonds the two or more sintered compacts through diffusion and liquid phase sintering to create a bond at or near the strength of the base material without large amounts of distortion.

It is an object of the present invention to provide a method of bonding two or more sintered compacts of tungsten heavy alloys. Another object of the present invention is to provide a method of bonding two or more sintered compacts of tungsten heavy alloys to produce a monolithic assembly of sintered compacts having a bond strength substantially equal to the strength of the sintered compacts. Still another object of the present invention is to provide a process of bonding two or more sintered compacts of tungsten heavy alloys to produce an assembly with minimal part distortion. Yet another object of the present invention is to provide a method of bonding two or more sintered compacts of tungsten heavy alloys that is simple and economical.

SUMMARY OF THE INVENTION

Briefly, according to the invention there is provided a method of bonding two or more sintered compacts of tungsten heavy alloys. The method includes the steps of providing two or more sintered compacts of tungsten heavy alloys and positioning the sintered compacts in adjacent alignment in a furnace chamber. A localized induction field is then applied at the juncture of the sintered compacts to bond the already sintered compacts and produce a monolithic assembly of sintered compacts. The bond strength of the monolithic assembly is substantially equal to the strength of the sintered compacts. Furthermore, the monolithic assembly of sintered compacts have a net-shape or near net-shape approximately equal to the combined sintered compacts.

BRIEF DESCRIPTION OF THE DRAWINGS

Further features and other objects and advantages of this invention will become clear from the following detailed description made with reference to the drawing in which.

DETAILED DESCRIPTION OF THE PREFERRED EMBODIMENTS

Figure 1:
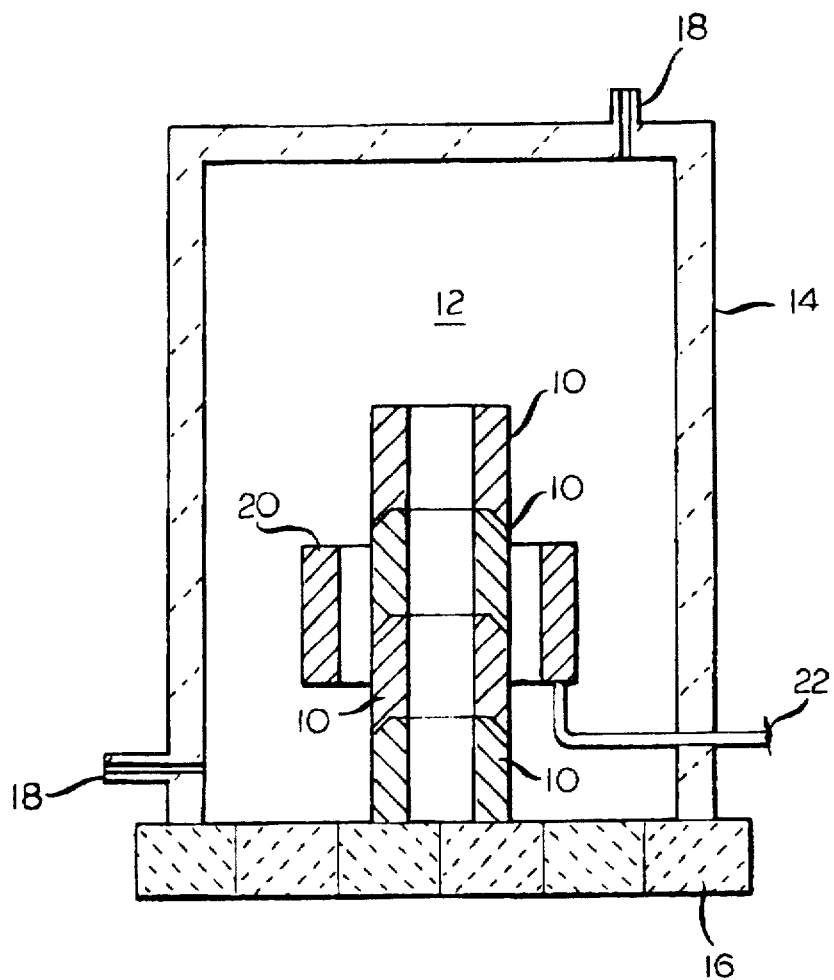
FIG. 1 is a cross-sectional view of a furnace for controlled localized heating of sintered compacts of tungsten heavy alloy in accordance with the present invention.

In the following description, like reference characters designate like or corresponding parts. Also in the following description, it is to be understood that such terms as "forward", "rearward", and the like, are words of convenience and are not to be construed as limiting terms apart from the invention as claimed.

The process of the present invention utilizes controlled localized heating of two or more sintered compacts of tungsten heavy alloy to produce a monolithic assembly of sintered compacts. The monolithic assembly of sintered compacts may then be machined and/or heat treated to a desired size and shape.

As used herein the term "monolithic" refers to an assembly without joints or seams. Upon completion of the sintering process, the joined area of the sintered compacts has the appearance and characteristics of the parent or base metal. Furthermore, the monolithic assembly of sintered compacts have a net-shape or near net-shape approximately equal to the combined sintered compacts.

The compacts are formed of tungsten heavy alloy. As used herein the term "tungsten heavy alloy" refers to a sintered tungsten powder alloy with a matrix metal of nickel, copper, cobalt and/or iron and mixtures thereof, the tungsten content being at least 85 wt % and density being at least 16.0 gm/cm3. As previously explained, the larger the size of the compact the more critical the tungsten to matrix metal ratio. The tungsten heavy alloy includes at least about 85 wt % tungsten, and preferably between about 85–97 wt % tungsten. The matrix metal includes no more than about 15 wt % of nickel, copper, and/or iron and mixtures thereof, and preferably, between about 3–15 wt % of nickel, copper, and/or iron and mixtures thereof. The limit of about 85 wt % tungsten and 15 wt % matrix metal is established based upon the ability of the tungsten skeleton to structurally support the compact in the liquid phase during liquid phase sintering.

The sintered compacts may be of most any suitable size, shape and weight to form a part of the final monolithic assembly. However, notwithstanding, the size, shape and weight of the sintered compacts should be sufficiently small such that the green compacts prior to sintering may be easily handled and do not suffer from slump during sintering.

The tungsten and matrix metal powder is isostatically pressed to form a green compact of the desired shape and size using conventional powder metallurgy techniques well known in the art. The green compacts are then sintered to densify the compacts. The green compacts are preferably heated in a controlled manner such that the compacts are deoxidized and further consolidated to reduce slumping during sintering. In liquid phase sintering, the heating cycle is also controlled so that the liquid phase forms uniformly, thereby preventing blistering and formation of voids.

The green compacts are sintered at a temperature between about 1300–1600 degrees celsius. At a temperature between about 1300–1440 degrees celsius solid state sintering occurs and at a temperature of about 1440–1600 liquid phase sintering occurs. The liquid phase sintering temperature is dependent on the alloy constituents and content, but typically begins at a temperature of about 1440 degrees celsius. The compacts are sintered at the desired temperature for between about 30–90 minutes to produce the sintered compacts.

It will be appreciated that solid state sintering and liquid phase sintering are each subject to a time-temperature relationship. In this respect, the desired objective of the particular step may be accomplished at different temperatures by varying the amount of time of the holding period. Accordingly, for a given composition and temperature, the time necessary at such temperature to achieve the desired end result can be determined by known analytical methods. The result achieved at a higher temperature can be achieved at a lower temperature if the assembly is maintained at the lower temperature for a longer period of time.

The sintered compacts 10 are then positioned in a chamber 12 of a furnace 14 in adjacent alignment to form the shape of the final sintered assembly. The sintered compacts 10 are first placed on a non-reactive, preferably ceramic support 16, and then inserted into the chamber 12 of the furnace 14. The furnace 14 may be most any suitable design well known in the powder metallurgy art. The surfaces of the sintered compacts 10 to be bonded must be clean, dry and in contact with one another. However, it will be appreciated that no extraordinary machining or surface preparation is required for bonding of the sintered compacts 10.

The furnace 14 is then evacuated through inert gas ports 18 after the sintered compacts 10 are placed in the chamber. The sintered compacts 10 may be bonded under vacuum, or under an inert gas such as nitrogen or argon, or under a reducing gas such as hydrogen, or under a combination thereof, e.g., 95 wt % $N_2$, 5 wt % $H_2$. The gas may be introduced to the furnace through gas ports 18 after the furnace is evacuated.

In accordance with the present invention, only the juncture of the sintered compacts 10 is bonded by heating first to a solid state sintering temperature and then a liquid phase sintering temperature under a controlled atmosphere. A gas flow is established past the sintered compacts through the ports 18 to purge any material liberated during the sintering process. Critical to the successful practice of the present invention is the use of the localized induction sintering to control bonding of the sintered compacts 10 to limit distortion and slump of the material. A localized induction field is applied at the juncture of the sintered compacts 10 by an induction coil 20 to bond the sintered compacts and produce a monolithic assembly of sintered compacts having a bond strength substantially equal to the strength of the sintered compacts. The induction coil 20 is energized by an electrical power input 22 to a suitable energy source. The induction coil 20 may be a multi-turn solenoid induction heating coil encapsulated in a refractory material of a type well known in the art.

It will be appreciated that the affect of the induction field from the induction coil 20 must be limited to the juncture of the sintered compacts 10 to minimize the affect of re-sintering the already sintered compacts. In a most preferred embodiment, the induction field is limited to about 0.5 inches on either side of the juncture of the sintered compacts 10 to localize the affect of the induction field.

The sintered compacts 10 are bonded by virtue of diffusion bonding and re-liquid phase sintering of a small section of metal on each side of the joint of the material. Accordingly, small sintered compacts, that may be easily handled and manufactured by traditional methods, may be joined in accordance with the present invention to form larger monolithic assemblies that would be otherwise impractical or impossible to manufacture by conventional methods.

The invention will be further clarified by a consideration of the following example, which is intended to be purely exemplary of the invention.

EXAMPLE

The feasibility of induction joining was evaluated on two billets of tungsten, nickel and iron alloys having an outside diameter of about 1.5 inches that had been sintered to full density. The billets were placed vertically end to end in a 3.12 inch inside diameter induction coil made from 7 turns of ½ inch tubing to span about 6.5 inches long. The induction coil was connected to a 200 kW motor generator. The billets were heated for 100 seconds at 26.4 kW and then at 5.6 kW for 400 seconds to provide for a soak period. Oxidation was minimized by using argon to blanket the billets during heating and furnace cooling.

Metallographic examination showed that the interface between the billets has bonded. The bond was denoted by a thin line of smaller tungsten grains. The longitudinal diametral section of one of the pairs revealed 5 regions of unbonded interface. The largest unbonded region was found to be only about 1100 microns long.

It will be appreciated from the foregoing description that the process of the present invention provides a novel process for producing a monolithic assembly for a wide variety of uses, including tungsten penetrators, bombs and kinetic energy devices, tungsten shielding, tungsten armor or tungsten counterweights/dampening devices and the like.

The patents and documents identified herein are hereby incorporated by reference.

Having described presently preferred embodiments of the present invention it will be appreciated that the invention may be otherwise embodied within the scope of the appended claims.

What is claimed is:

1. A method of bonding two or more sintered compacts of tungsten heavy alloys comprising the steps of:
providing two or more sintered compacts of tungsten heavy alloy powder;
positioning the sintered compacts in adjacent alignment in a furnace chamber; and
applying a localized induction field only at the juncture of the sintered compacts to bond the sintered compacts and produce a monolithic assembly of sintered compacts having a bond strength substantially equal to the strength of the sintered compacts.

2. The method of claim 1 wherein the tungsten heavy alloy powder comprises tungsten and a matrix metal selected from the group consisting of nickel, copper, cobalt and iron and mixtures thereof.

3. The method of claim 2 wherein the tungsten heavy alloy powder includes at least about 85 wt % tungsten and no more than about 15 wt % nickel, copper, and iron and mixtures thereof.

4. The method of claim 2 further comprising the steps of isostatically pressing the tungsten and matrix metal to form a green compact and then sintering the green compacts to densify the compacts.

5. The method of claim 4 wherein the green compacts are sintered at a temperature between about 1300–1600 degrees celsius.

6. The method of claim 1 wherein the sintered compacts are bonded under vacuum.

7. The method of claim 1 wherein the sintered compacts are bonded under an inert gas atmosphere.

8. The method of claim 1 wherein the sintered compacts are bonded under a reducing gas atmosphere.

9. The method of claim 1 wherein only the juncture of the sintered compacts is heated first to a solid state sintering temperature and then to a liquid phase sintering temperature under a controlled atmosphere.

10. The method of claim 1 wherein the localized induction field is applied by an induction coil.

11. The method of claim 10 wherein the induction coil is a multi-turn solenoid induction heating coil encapsulated in a refractory material.

12. The method of claim 10 wherein the localized induction field is limited to about 0.5 inches on either side of the juncture of the sintered compacts to localize the affect of the induction field.

13. A method of bonding two or more sintered compacts of tungsten heavy alloys comprising the steps of:
blending a mixture of tungsten heavy alloy powder;
isostatically pressing the tungsten heavy alloy powder to form at least two green compacts;
sintering the green compacts;
positioning the sintered compacts in adjacent alignment in a furnace chamber;
evacuating and backfilling the furnace chamber with a controlled atmosphere;
applying a localized induction field at the juncture of the sintered compacts to bond the sintered compacts and produce a monolithic assembly of sintered compacts having a bond strength of at least 80% of the strength of the sintered compacts.

14. The method of claim 13 wherein the tungsten heavy alloy powder comprises tungsten and a matrix metal selected from the group consisting of nickel, copper, cobalt and iron and mixtures thereof.

15. The method of claim 13 wherein the tungsten heavy alloy powder includes at least about 85 wt % tungsten and no more than about 15 wt % nickel, copper, or iron and mixtures thereof.

16. The method of claim 13 wherein the green compacts are sintered at a temperature between about 1300–1600 degrees celsius.

17. The method of claim 13 wherein only the juncture of the sintered compacts is bonded by heating the juncture of the sintered compacts first to a solid state sintering temperature and then to a liquid phase sintering temperature.

18. The method of claim 17 wherein the localized induction field is applied by an induction coil.

19. The method of claim 18 wherein the induction coil is a multi-turn solenoid induction heating coil encapsulated in a refractory material.

20. The method of claim 17 wherein the localized induction field is limited to about 0.5 inches on either side of the juncture of the sintered compacts to localize the affect of the induction field.

* * * * *